United States Patent [19]
Peveraro

[11] 3,902,428
[45] Sept. 2, 1975

[54] TRACKED VEHICLE SYSTEMS
[75] Inventor: Cesare Peveraro, Bergamo, Italy
[73] Assignee: Societa' per la Strada Guidata, s.r.l., Italy
[22] Filed: Apr. 26, 1974
[21] Appl. No.: 464,998

[30] Foreign Application Priority Data
June 22, 1973 Italy .................................. 9513/73

[52] U.S. Cl. ................................. 104/130; 104/96
[51] Int. Cl. ............................................ E01b 25/06
[58] Field of Search ......... 104/89, 91, 96, 105, 130, 104/88; 105/215 R

[56] References Cited
UNITED STATES PATENTS
3,712,239  1/1973  Colovas ............................. 104/130
3,759,187  9/1973  Gayot ................................. 104/130

Primary Examiner—M. Henson Wood, Jr.
Assistant Examiner—D. W. Keen
Attorney, Agent, or Firm—Eugene J. Kalil; Francis J. Murphy

[57] ABSTRACT

A vehicle for use in a tracked vehicle system comprises inner horizontal guide wheels arranged at respective sides of the vehicle to engage inner side walls of a track, and outer horizontal guide wheels arranged at respective sides of the vehicle to engage outer side walls of the track. Guidance of the vehicle is selectively provided by means of the inner guide walls at both sides of the vehicle, or by means of the inner and outer guide wheels at one side of the vehicle. The outer guide wheels are movable between operative and inoperative positions to determine switching of the vehicle upon reaching a switching section.

2 Claims, 5 Drawing Figures

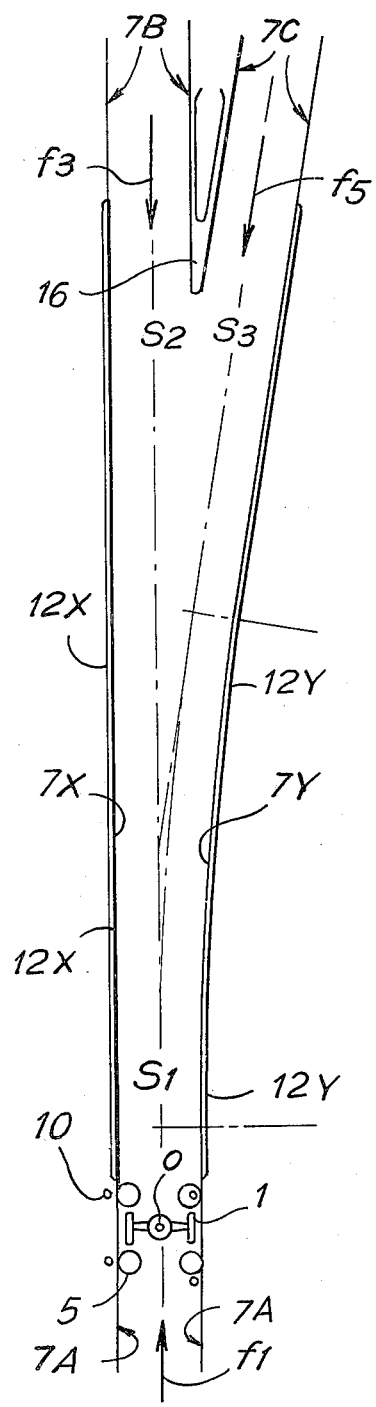
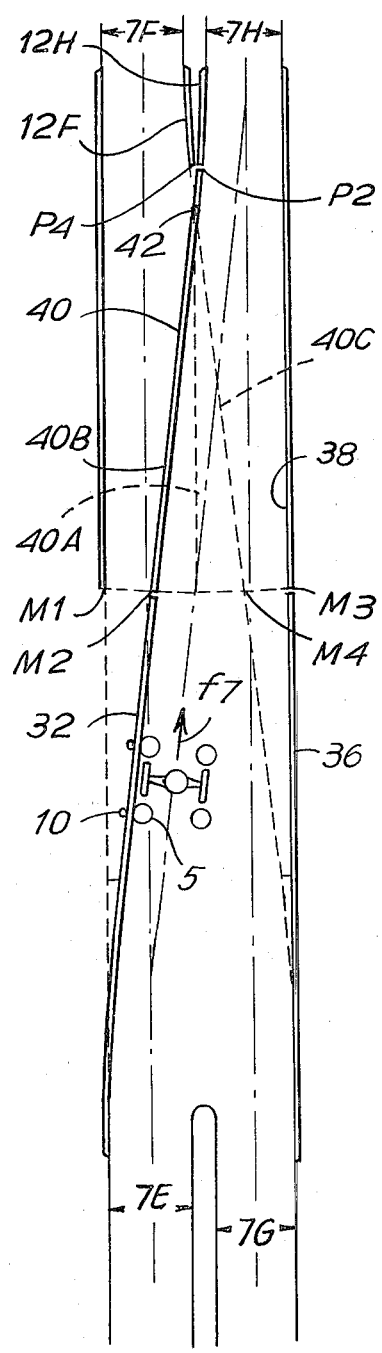

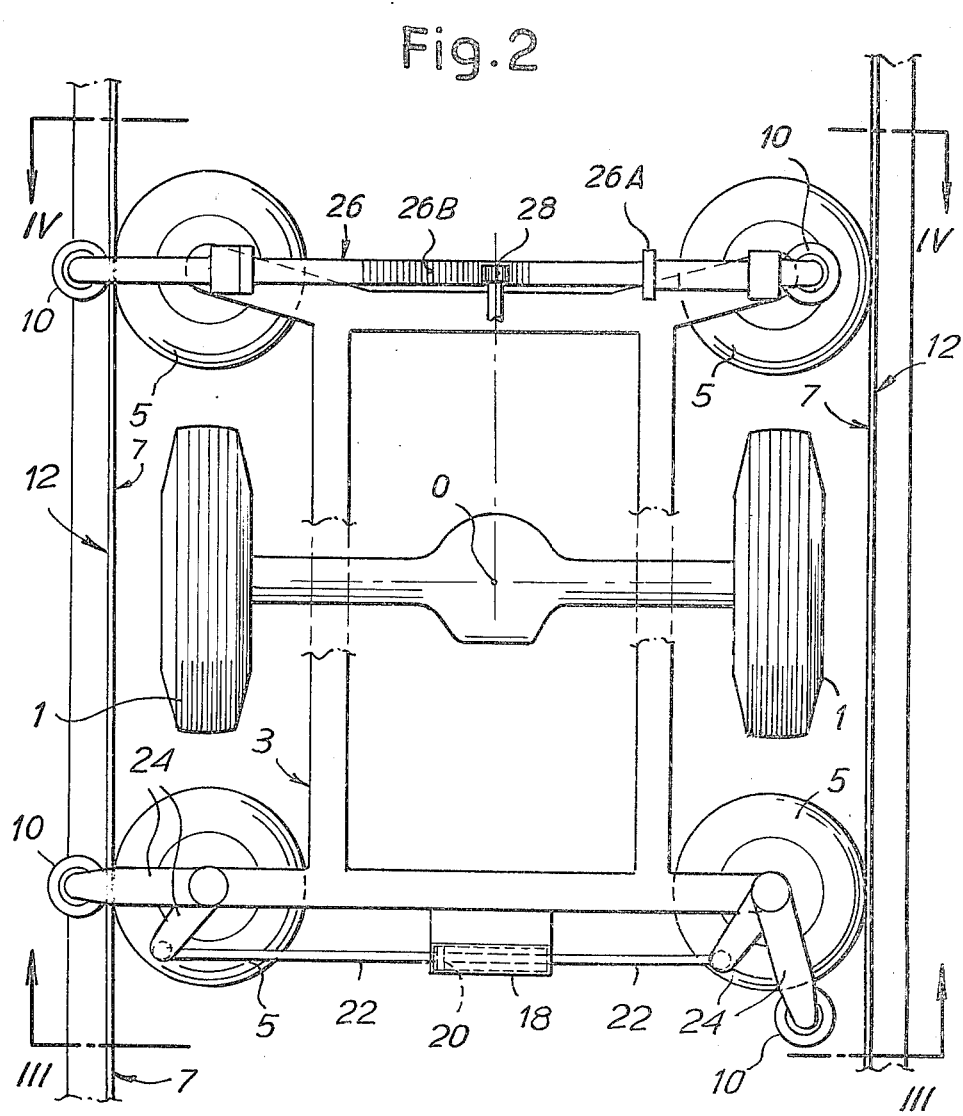

3,902,428

TRACKED VEHICLE SYSTEMS

FIELD OF THE INVENTION

The present invention relates to tracked vehicle systems.

SUMMARY OF THE INVENTION

According to one aspect of the present invention, there is provided a vehicle for use in a tracked vehicle system, said vehicle comprising horizontal inner guide wheels arranged at opposite sides of the vehicle to co-operate with opposed inner side walls of a track, horizontal outer guide wheels positioned at opposite sides of the vehicle at a higher level than the inner guide wheels, and means operative to move the outer guide wheels from an inoperative position to an operative position in which the outer guide wheels co-operate with outer side walls of the track whereby guidance of the vehicle is selectively provided by means of the inner guide wheels co-operating with the said opposed inner side walls of the track or by means of the inner and outer guide walls at one side of the vehicle co-operating with inner and outer side walls at that side of the vehicle.

According to another aspect of the invention, there is provided a tracked vehicle system for the above vehicle comprising a switch section operative to switch a said vehicle entering said section along one track to a selected one of two further tracks, and comprising first switch rail means extending from one side of said one track to one of said two further tracks, and second switch rail means extending from the other side of the said one track to the other of said two further tracks, each of said switch rail means having an inner and outer side wall for co-operation with the inner and outer guide wheels at the respective sides of the vehicle whereby switching of the vehicle is determined by movement of the outer wheels at one side of the outer wheels at one side of the vehicle into their operative positions.

BRIEF DESCRIPTION OF THE DRAWINGS

Embodiments of the invention will now be described, by way of example only, with reference to the accompanying diagrammatic drawings, in which:

FIG. 1 illustrates a plan view of a switch section of a tracked vehicle system in accordance with the invention;

FIG. 2 is a plan view of a guiding unit of a vehicle of the tracked vehicle system;

FIG. 5 is a plan view of another form of switch section.

DESCRIPTION OF THE PREFERRED EMBODIMENT

Figure 3:
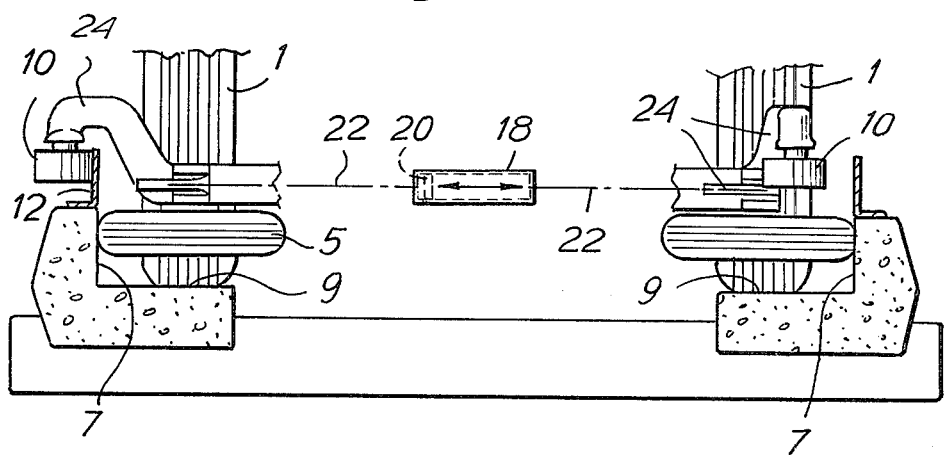
FIG. 3 is an elevation in the direction of arrows III—III in FIG. 2.

As shown in the drawings, a tracked vehicle comprises tired drive wheels 1 carried by a drive axle. The wheels 1 are guided by means of a guiding unit 3(FIG. 2) which together with the drive axle, is linked to the chassis of the vehicle for pivotal movement about a vertical axis 0. The guiding unit 3 has four horizontal guide wheels 5 rotatable about vertical axes and arranged to co-operate with opposed inner side walls 7 of a track, the side walls 7 being located immediately outside of portions 9 of the track engaged by the wheels 1.

The guiding unit 3 can be guided at each side by means of the wheels 5 or, selectively at a single side. The provision for guidance at one side only is in essence provided for use along switch sections of the track whereby to obtain positive guidance during transit of the vehicle along the switch section and to permit switching of the vehicle from one track to another.

To permit guidance at one side only, there are provided outer guide rollers or wheels 10 rotatable about vertical axes; each wheel 10 is associated with a respective wheel 5 and is located at a higher level than the wheels 5. The wheels 10 at one side of the unit 3 are arranged to engage the outer side walls 12 of the track at those areas in which guidance has to take place on a single side. In practice, the outer side walls 12 may be formed by rails superposed on the structures forming the outer side walls 7. When guidance is to be provided on a single side, the wheels 5 and 10 at that side are arranged as shown at the left-hand side of FIGS. 2 and 3, and at the right-hand side of FIG. 4; in this manner, two wheels 5 and two wheels 10 at the relevant side ensure positive guidance of the unit 3 and thus of the wheels 1.

A switch section of the track is shown in FIG. 1. In the case of a vehicle entering the switch section in the direction of the arrow $f_1$ from a track defined by side walls 7A, the vehicle can selectively leave the switch section along a track defined by side walls 7B in alignment with the side walls 7A, or along a track defined by side walls 7C. A vehicle entering the switch section along the tracks defined by the side walls 7B or 7C in the direction of the arrows $f_3$ or $f_5$ respectively, will leave the switch section along the track defined by the side walls 7A. All the components of the switch section illustrated in FIG. 1 are stationary. The switch section comprises an unterrupted structure 7X which connects the left-hand side walls 7A and 7B as viewed in FIG. 1, and a structure 7Y which connects the right-hand side walls 7A and 7C as viewed in FIG. 1. In correspondence of the structures 7X and 7Y, there are provided structures 12X and 12Y respectively, which act to guide the wheels 10. The structures 12X and 12Y extend from a zone S1 of the switch section wherein guidance is provided by the four inner guide wheels 5 and by the wheels 10 located at one side of the guiding unit 3; this permits posisitive guidance at all times during transfer of the guidance function from the four wheels 5 to the associated wheels 5 and 10 at one side of the guiding unit. A similar arrangement occurs in zones S2 and S3 where the "heart" 16 is located, the heart being formed by the convergence of the structures forming the innermost side walls 7B and 7C.

Selection of the desired track is obtained by moving the wheels 10 at the appropriate side of the guiding unit 3 into an operative position outside of the associated wheels 5. The wheels 10 at the other side of the guiding unit are located in an inoperative position in which they are preferably located within an imaginary cylinder containing the periphery of the associated wheel 5. Movement of the wheels 10 between their operative and inoperative positions can be obtained in any suitable manner, the arrangement preferably being such that when the wheels 10 at one side are moved into their operative positions, the wheels 10 at the other side are moved simultaneously into their inoperative positions. The respective wheels 10 are held in their operative positions in such a manner that they are able to withstand lateral thrusts.

Figure 4:
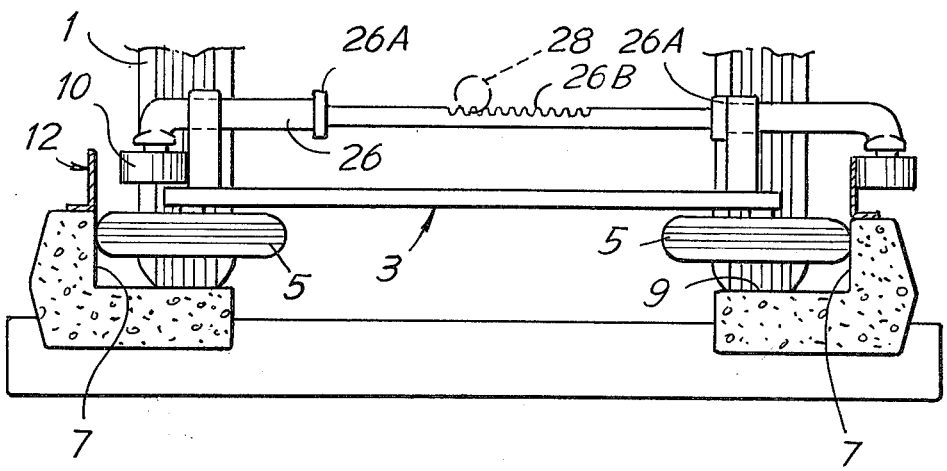
FIG. 4 is an elevation in the direction of arrows IV—IV in FIG. 2.

Two suitable systems for moving the wheels 10 are shown in the lower half of FIG. 2 and FIG. 3, and in the upper half of FIG. 2 and FIG. 4, respectively.

The system shown in the lower half of FIG. 2 and FIG. 3 is a hydraulic or other fluid-actuated system and comprises a double-acting cylinder 18 having a piston 20 to which movable members 24, carrying respective wheels 10, are connected by means of cranks 22 or other linkages; as shown in the drawings the members 24 are angularly movable coaxially with respect to the respective wheels 5. At one end of the stroke of the piston 20, the left-hand wheel 10 is located in its operative position, whereas the right-hand wheel 10 is located in its inoperative position; the reverse situation occurs when the piston 20 is at the other end of its stroke.

The system shown in the upper half of FIG. 2 and FIG. 4 is mechanical system comprising a slide member 26 transversely movable on the guiding unit 3 between two stop positions defined by respective abutments 26A which alternately engage the structure of the unit 3. The slide member 26 is formed with rack teeth 26B which mesh with a driving pinion 28. In this system also, when one of the wheels 10 is located in its operative position, the opposite wheel 10 is located in its inoperative position. In this manner simultaneous engagement of the opposite wheels 10 with the two fixed structures 12X and 12Y is prevented.

Preferably, the system for moving the wheels 10 incorporates means for ensuring that the wheels 10 are located only in their operative or inoperative position and not in any intermediate position.

Control of the wheels 10 can be effected from the vehicle without the need for control means on the track; alternatively, the wheels 10 can be controlled by suitable ground control means via remote control transmission, or via a direct mechanical action on members carrying the wheels 10.

Considering the switch section of FIG. 1, when a vehicle reaches the switch zone S1 in the direction of the arrow $f_1$, if the left-hand wheels 10 are in their operative position, the vehicle will be guided by the inner and outer side walls formed by the structures 7X, 12X and will leave the switch section along the track defined by the side walls 7B. The right-hand wheels 10 are located in their inoperative positions internally of the side walls 7A and thus to not engage the structure 12Y; when the vehicle leaves the switch zone S1, the right-hand wheels 5 take no part in the guidance function until the vehicle enters the switch zone S2 at the entry to the tracks defined by the side walls 7B. In the zones S1 and S2 guidance is effected by means of all four wheels 5, and the two left-hand wheels 10 whereby to ensure positive guidance at all times during transference of the guidance function firstly from the four wheels 5 to the left-hand wheels 5 and 10, and thence from these wheels back to to the four wheels 5.

If, when the vehicle reaches the switch zone S1 the right-hand wheels 10 are located in their operative position, the vehicle will be guided by the structures 7Y and 12Y, and will leave the switch section along the track defined by the side walls 7C.

The switch section shown in FIG. 5 can provide double communication between parallel tracks. As shown in FIG. 5, there are provided tracks 7E, 7F, aligned with each other, and tracks 7G, 7H, also aligned with each other and parallel to the tracks 7E and 7F. The switch section comprises a resilient switch blade 32 extending from the outer side of the track 7E, and a resilient switch blade 36 extending from the outer side of the track 7G. The tip of the blade 32 is movable between points M1 and M2, and the tip of the blade 36 is movable between points M3 and M4. A rigid rectilinear switch blade 40 is pivoted at 42 and is capable of assuming an intermediate neutral position 40A and two symmetrical inclined positions 40B and 40C in which it respectively reaches the points M2 and M4 with one of its ends and with its other end points P2 and P4, in alignment with stationary arcuate structures 12H and 12F arranged to co-operate with the wheels 10. The blades 32, 36 and 40 have inner and outer side walls for cooperation with the wheels 5 and 10 at one side of the vehicle.

Assuming that a vehicle enters the switch section from the track 7E in the direction of the arrow $f_7$, when the blade 32 is positioned with its tip at the point M2 with the blade 40 in position 40B, the left-hand wheels 10 are located in their operative position before the vehicle leaves the track 7E and the vehicle is then guided on the left-hand side by the blades 32 and 40, and the structure 12H, and thus reaches the track 7H; clearly, with the blades arranged in this manner, a vehicle entering the switch section from the track 7H can be switched to the track 7E if its right-hand wheels 10 (in the direction of movement of the vehicle) are in their operative positions. In the arrangement illustrated, the tip of the blade 36 is located at the point M3 in alignment with the end of a fixed blade 38, and thus by positioning the appropriate wheels 10 in their operative positions the vehicle can be guided by the blades 36, 38 whereby a vehicle entering the switch section from the track 7G will leave along the track 7H, and vice versa. After a suitable movement of the blades 32, 36, and 40, switching can be obtained in a similar manner between the tracks 7E and 7F and the tracks 7G and 7F.

Locking means are provided at the points M1, M2, M3, M4 to hold the various blades in alignment.

It will be noted that when the switch blades are arranged as shown in FIG. 5, the switching of a vehicle entering the switch section from the track 7H is determined merely by movement of the wheels 10 in the indicated manner and without any movement of ground members.

The system described is suitable for use with tracked vehicles without conventional railway-type flanged drive wheels.

The switch sections described above are relatively simple and compact and are safe in use. Control or operation of the movable members — such as brackets or supports for the movable outer wheels-can be effected in the vehicle by the driver of the vehicle; thus the driver of the vehicle can, to at least a certain extent, determine the route of the vehicle when the vehicle reaches switching sections of the track. It is however possible to use suitable electric and/or electromechanical means on the track to control switching.

What is claimed is:

1. A tracked vehicle system for a vehicle having horizontal drive wheels on two opposed sides for cooperation with opposing internal surfaces of a track and at least one guide wheel on each of said sides, said guide wheel being adopted to cooperate with an external surface on said track to permit said vehicle to be driven on only one of said sides, said system including
- a switch section operative to switch said vehicle entering said section along one of two of said tracks to a selected one of two additional ones of said tracks said switch section including
- a rigid rectilinear blade pivotal so that said blade is movable from a central inoperative position into a selected one of two operative positions said operative positions being located respectively on each side of said central position, and
- a pair of opposed resilient blades each of said resilient blades having a fixed end and a movable end and each of said resilient blades being deflectable from a rectilinear configuration into an arcuate configuration in which said movable end is alignable with one end of said rigid blade when said rigid blade is located in one of said operative positions.

2. A tracked vehicle system as claimed in claim 1 including locking means arranged to maintain said rigid blade in one of said operative positions and to selectively hold one of resilient blades in said arcuate configuration so that said movable end of said one resilient blade is aligned with said rigid blade when said rigid blade is in one of said operative positions.

* * * * *